United States Patent
Cook et al.

(10) Patent No.: US 8,710,701 B2
(45) Date of Patent: *Apr. 29, 2014

(54) ANTENNAS AND THEIR COUPLING CHARACTERISTICS FOR WIRELESS POWER TRANSFER VIA MAGNETIC COUPLING

(71) Applicant: QUALCOMM Incorporated, San Diego, CA (US)

(72) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,543

(22) Filed: Dec. 17, 2012

(65) Prior Publication Data

US 2013/0293024 A1 Nov. 7, 2013

Related U.S. Application Data

(63) Continuation of application No. 12/394,033, filed on Feb. 26, 2009, now Pat. No. 8,344,552.

(60) Provisional application No. 61/032,061, filed on Feb. 27, 2008.

(51) Int. Cl.
*H01F 27/42* (2006.01)

(52) U.S. Cl.
USPC ........................................ 307/104; 307/149

(58) Field of Classification Search
USPC .................................. 307/104, 149
See application file for complete search history.

(56) References Cited

U.S. PATENT DOCUMENTS

| | | |
|---|---|---|
| 5,889,384 A | 3/1999 | Hayes et al. |
| 6,483,202 B1 | 11/2002 | Boys |
| 6,515,878 B1 | 2/2003 | Meins et al. |

(Continued)

OTHER PUBLICATIONS

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 on page(s): 1 Print ISBN: 978-1-4244-1848-0 INSPEC Accession No. 10394615 Digital Object Identifier : 10.1109/VPPC.2008.4677798 Date of Current Version : Nov. 18, 2008.

(Continued)

*Primary Examiner* — Robert L. Deberadinis
(74) *Attorney, Agent, or Firm* — Knobbe, Martens, Olson & Bear LLP

(57) ABSTRACT

The disclosure provides systems, methods, and apparatus for wireless power transfer. In one aspect, an apparatus configured to receive wireless power from a transmitter is provided. The apparatus includes an inductor having a inductance value. The apparatus further includes a capacitor electrically connected to the inductor and having a capacitance value. The apparatus further includes an optimizing circuit configured to optimize transfer efficiency of power received wirelessly from the transmitter, provided that an amount of the power received wirelessly and provided to a load is greater than or equal to a received power threshold, or optimize the amount of the power received wirelessly from the transmitter, provided that the power transfer efficiency is greater than or equal to an efficiency threshold.

27 Claims, 3 Drawing Sheets

(56) References Cited

U.S. PATENT DOCUMENTS

| | | |
|---|---|---|
| 7,159,774 B2 | 1/2007 | Woodard et al. |
| 7,639,514 B2 | 12/2009 | Baarman |
| 7,741,734 B2 | 6/2010 | Joannopoulos et al. |
| 7,825,543 B2 | 11/2010 | Karalis et al. |
| 7,868,482 B2 | 1/2011 | Greene et al. |
| 7,919,886 B2 | 4/2011 | Tanaka |
| 8,344,552 B2 * | 1/2013 | Cook et al. ............. 307/104 |
| 2005/0127867 A1 | 6/2005 | Calhoon et al. |
| 2005/0131495 A1 | 6/2005 | Parramon et al. |
| 2007/0222542 A1 | 9/2007 | Joannopoulos et al. |
| 2007/0228833 A1 | 10/2007 | Stevens et al. |
| 2007/0285325 A1 | 12/2007 | St. Clair |
| 2008/0054638 A1 | 3/2008 | Greene et al. |
| 2008/0067874 A1 | 3/2008 | Tseng |
| 2008/0191897 A1 | 8/2008 | Mccollough |
| 2008/0278264 A1 | 11/2008 | Karalis et al. |
| 2009/0001941 A1 | 1/2009 | Hsu et al. |
| 2009/0067208 A1 | 3/2009 | Martin et al. |
| 2009/0108805 A1 | 4/2009 | Liu et al. |
| 2009/0160261 A1 | 6/2009 | Elo |
| 2009/0167449 A1 | 7/2009 | Cook et al. |
| 2009/0243394 A1 | 10/2009 | Levine |
| 2009/0284083 A1 | 11/2009 | Karalis et al. |
| 2009/0284245 A1 | 11/2009 | Kirby et al. |
| 2009/0302933 A1 | 12/2009 | Boys et al. |
| 2009/0308933 A1 | 12/2009 | Osada |
| 2010/0109445 A1 | 5/2010 | Kurs et al. |
| 2010/0117456 A1 | 5/2010 | Karalis et al. |
| 2010/0164296 A1 | 7/2010 | Kurs et al. |
| 2010/0181845 A1 | 7/2010 | Fiorello et al. |
| 2010/0181961 A1 | 7/2010 | Novak et al. |
| 2010/0201310 A1 | 8/2010 | Vorenkamp et al. |
| 2010/0222010 A1 | 9/2010 | Ozaki et al. |
| 2010/0231053 A1 | 9/2010 | Karalis et al. |
| 2010/0277121 A1 | 11/2010 | Hall et al. |
| 2010/0289449 A1 | 11/2010 | Elo |
| 2011/0095618 A1 | 4/2011 | Schatz et al. |

OTHER PUBLICATIONS

Karalis et al., "Efficient wireless non-radiative mid-range energy transfer", MIT paper, publication and date unknown, believed to be 2007.

Karalis et al., "Wireless Non-Radiative Energy Transfer", MIT paper, publication and date unknown, believed to be 2007.

Kim, et al., Switchable polymer-based thin film coils as a power module wireless neural interfaces, Sensors and Actuators, vol. A 136, Issue 1, May 2007 (available online Nov. 27, 2006), pp. 467-474.

Kurs et al., "Wireless Power Transfer via Strongly Coupled Magnetic Resonances", Science Express, Jun. 7, 2007, pp. 83-86, vol. 317 No. 5834, DOI: 10.1126/science.1143254.

Kurs et al., "Wireless Power Transfer via Strongly Coupled Magnetic Resonances", scimag.org, Jul. 6, 2007.

Onizuka, et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

Schuder J.C., et al., "High Level electromagnetic energy transfer through a closed wall", Inst.Radio Engrs. Int.Conf Record 9, pp. 119-126, 1961.

Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

* cited by examiner

ANTENNAS AND THEIR COUPLING CHARACTERISTICS FOR WIRELESS POWER TRANSFER VIA MAGNETIC COUPLING

CROSS-REFERENCE TO RELATED APPLICATIONS

This application is a continuation of U.S. patent application Ser. No. 12/394,033, filed on Feb. 26, 2009 which claims priority benefit from U.S. provisional patent application No. 61/032,061, entitled "Antennas and Their Coupling Characteristics for Wireless Power Transfer via Magnetic Coupling, filed Feb. 27, 2008. Each of the above referenced applications are hereby incorporated herein by reference in their entirety.

BACKGROUND

Our previous applications and provisional applications, including, but not limited to, U.S. patent application Ser. No. 12/018,069, filed Jan. 22, 2008, entitled "Wireless Apparatus and Methods", the disclosure of which is herewith incorporated by reference, describe wireless transfer of power.

The transmit and receiving antennas are preferably resonant antennas, which are substantially resonant, e.g., within 10% of resonance, 15% of resonance, or 20% of resonance. The antenna is preferably of a small size to allow it to fit into a mobile, handheld device where the available space for the antenna may be limited.

An embodiment describes a high efficiency antenna for the specific characteristics and environment for the power being transmitted and received.

Antenna theory suggests that a highly efficient but small antenna will typically have a narrow band of frequencies over which it will be efficient. The special antenna described herein may be particularly useful for this kind of power transfer.

One embodiment uses an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$)

SUMMARY

The present application describes the way in which the "antennas" or coils interact with one another to couple wirelessly the power therebetween.

DETAILED DESCRIPTION

Figure 1:
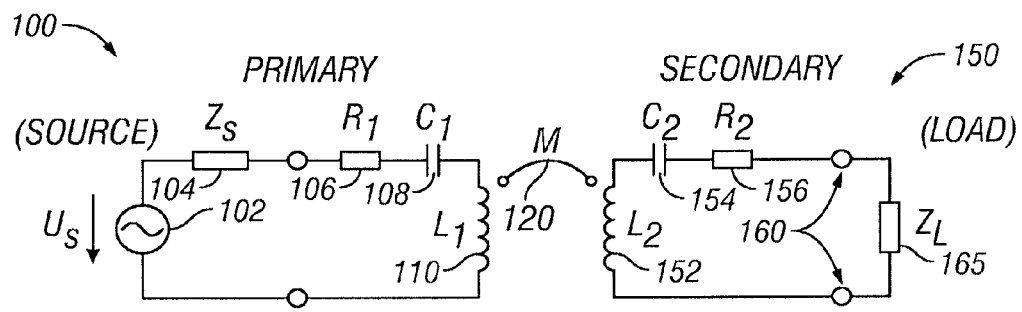
FIG. 1 shows a diagram of a wireless power circuit.

FIG. 1 is a block diagram of an inductively coupled energy transmission system between a source 100, and a load 150. The source includes a power supply 102 with internal impedance $Z_s$ 104, a series resistance $R_4$ 106, a capacitance C1 108 and inductance L1 110. The LC constant of capacitor 108 and inductor 110 causes oscillation at a specified frequency.

The secondary 150 also includes an inductance L2 152 and capacitance C2 154, preferably matched to the capacitance and inductance of the primary. A series resistance R2 156. Output power is produced across terminals 160 and applied to a load ZL 165 to power that load. In this way, the power from the source 102 is coupled to the load 165 through a wireless connection shown as 120. The wireless communication is set by the mutual inductance M.

Figure 2:
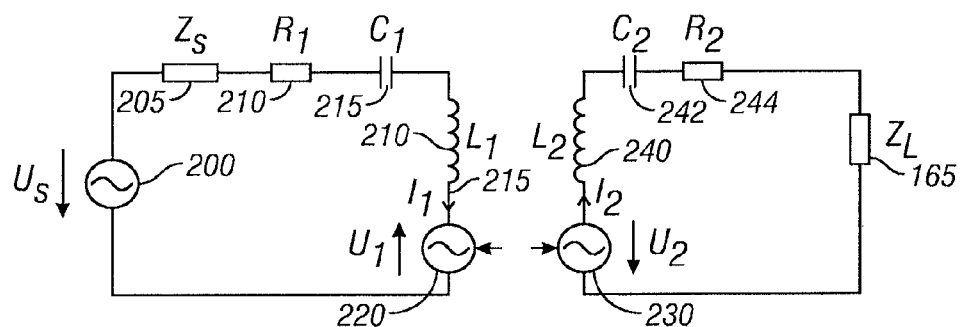
FIG. 2 shows an equivalent circuit.

FIG. 2 shows an equivalent circuit to the transmission system of FIG. 1. The power generator 200 has internal impedance Zs 205, and a series resistance R1 210. Capacitor C1 215 and inductor L1 210 form the LC constant. A current I1 215 flows through the LC combination, which can be visualized as an equivalent source shown as 220, with a value U1.

This source induces into a corresponding equivalent power source 230 in the receiver, to create an induced power U2. The source 230 is in series with inductance L2 240, capacitance C2 242, resistance R2 244, and eventually to the load 165.

Considering these values, the equations for mutual inductance are as follows:

$$U_2 = j\omega M I_1$$

$$U_1 = j\omega M I_2$$

where:

$$z_M = j\omega M$$

$$z_1 = z_s + R_1 + j\left(\omega L_1 - \frac{1}{\omega C_1}\right)$$

$$z_2 = z_L + R_2 + j\left(\omega L_{21} - \frac{1}{\omega C_2}\right)$$

$$z_s = R_s + jX_s$$

$$z_L = R_L + jX_L$$

The Mesh equations are:

$$U_s + U_1 - z_1 I_1 = 0 \rightarrow I_1 = (U_s + U_1)/z_1$$

$$U_2 - z_2 I_2 = 0 \qquad I_2 = U_2/z_2$$

$$I_1 = \frac{U_s + z_M I_2}{z_1} \quad I_2 = \frac{z_M I_1}{z_2} \rightarrow I_2 =$$

$$\frac{z_M(U_s + z_M I_2)}{z_1 z_2} = \frac{z_M U_s}{z_1 z_2 - z_M^2} \rightarrow I_1 = \frac{z_M}{z_M} \cdot I_2 = \frac{z_2 U_s}{z_1 z_2 - z_M^2}$$

where:
Source power:

$$P_1 = \text{Re}\{U_s \cdot I^*_1\} = U_s \cdot \text{Re}\{I^*_1\} \text{ for avg}\{U_s\} = 0$$

Power into load:

$$P_2 = I_2 \cdot I^*_2 \text{Re}\{z_L\} = |I_2|^2 \cdot \text{Re}\{z_L\} = |I_2|^2 \cdot R_L$$

Transfer efficiency:

$$\eta = \frac{P_2}{P_1} = \frac{I_2 \cdot I^*_2 R_L}{U_s \text{Re}\{I^*_1\}}$$

$$I_2 \cdot I^*_2 = \frac{z_M z^*_M U^2_s}{(z_1 z_2 - z_{M2})(z^*_1 z^*_2 - z^*_{M2})}$$

$$\text{Re}\{I^*_1\} = \text{Re}\left\{\frac{z^*_2 U_s}{z^*_1 z^* - z^*_{M2}}\right\}$$

Overall transfer Efficiency is therefore:

$$\eta = \frac{P_2}{P_1} = \frac{U_s^2 \cdot R_L z_M z_M^*}{(z_1 z_2 - z_M^2)(z_1^* z_2^* - z_{M^2}^*)}$$

Def.: $z^1 = z_1 z_2 - z_{M^2}$ $$\to \eta = \frac{P_2}{P_1} = \frac{R_L z_M z_M^*}{z' z^* \mathrm{Re}\left\{\frac{z_2^* z'}{z' z'^*}\right\}} = \frac{R_L z_M z_M^*}{\mathrm{Re}\{z_2^* \cdot z'\}}$$

$$= \frac{R_L z_M z_M^*}{\mathrm{Re}\{z_2^*(z_1 z_2 - z_M^2)\}} = \frac{R_L |z_M|^2}{\mathrm{Re}\{z_1 |z_2|^2 - z_2^* z_M^2\}}$$

$$\to \eta = \frac{P_2}{P_1} = \frac{R_L |z_M|^2}{|z_2|^2 \cdot \mathrm{Re}\{z_1\} - z_M^2 \mathrm{Re}\{z_2^*\}}$$

$\mathrm{Re}\{z_1\} = R_s + R_1$ $\mathrm{Re}\{z_2^*\} = R_L + R_2$ $|z_2|^2 = (R_L + R_2)^2 + \left(\omega L_2 - \frac{1}{\omega C_2} + X_L\right)^2$ $|z_M|^2 = \omega^2 M^2$ $z_{M^2} = (j\omega M)^2 = -\omega^2 M^2$ A Transfer efficiency equation can therefore be expressed as:

$$\boxed{\eta = \frac{P_2}{P_1} = \frac{\omega^2 M^2 \cdot R_L}{(R_s + R_n)\left[(R_L + R_2)^2 + \left(\omega L_2 - \frac{1}{\omega C_2} + X_L\right)^2\right] + \omega^2 M^2 (R_L + R_2)}}$$

Which reduces in special cases as follows:
A) when $\omega = \omega_0 = 1/\sqrt{L_2 C_2}$, $X_L = 0$ or where $$\omega L_2 - \frac{1}{\omega C_2} + X_L(\omega) = 0$$

$$\boxed{\eta = \frac{P_2}{P_1} = \frac{\omega_0^2 M^2}{[(R_s + R_n)(R_L + R_2) + \omega_0^2 M^2]} \cdot \frac{R_L}{(R_L + R_2)}}$$

B) when $\omega = \omega_0$, $R_s = 0$:

$$\eta = \frac{P_2}{P_1} = \frac{\omega_0^2 M^2 R_L}{R_1 (R_L + R_2)^2 + \omega_0^2 M^2 (R_L + R_2)}$$

C) when $\omega = \omega_0$, $R_s = 0$ $R_L = R_2$:

$$\eta = \frac{P_2}{P_1} = \frac{\omega_0^2 M^2}{4 R_1 R_2 + 2 \omega_0^2 M^2}$$

D) when $\omega = \omega_0$, $R_s = 0$ $R_L = R_2$ $2 R_1 R_2 \gg \omega_0^2 M^2$:

$$\eta = \frac{P_2}{P_1} \cong \frac{\omega_0^2 M^2}{4 R_1 R_2} \text{ (weak coupling)}$$

where:
Mutual inductance:
$M = k\sqrt{L_1 L_2}$ where k is the coupling factor
Loaded Q factors:

$$Q_{1,L} = \frac{\omega L_1}{R_s + R_1} \quad Q_{2,L} = \frac{\omega L_2}{R_L + R_2}$$

Therefore, the transfer efficiency in terms of these new definitions:
A) when $\omega = \omega_0$ $$\eta = \frac{P_2}{P_1} = \frac{k^2 \cdot \frac{\omega_0 L \cdot \omega_0 L_2}{(R_s + R_1)(R_L + R_2)}}{1 + k^2 \cdot \frac{\omega_0 L \cdot \omega_0 L_2}{(R_s + R_1)(R_L + R_2)}} \cdot \frac{R_L}{R_L + R_2}$$

$$\boxed{\eta = \frac{k^2 \cdot Q_{1,L} \cdot Q_{2,L}}{1 + k^2 \cdot Q_{1,L} \cdot Q_{2,L}} \cdot \frac{R_L}{R_L + R_2}}$$

C) when $\omega = \omega_0$, $R_L = R_2$, ($R_s = 0$):

$$\eta = \frac{k^2 \cdot Q_{1,L} \cdot Q_{2,L}}{2(1 + k^2 \cdot Q_{1,L} Q_{2,L})} = \frac{k^2 \cdot Q_{1,UL} \cdot Q_{2,UL}}{4(1 + k^2 \cdot Q_{1,UL} Q_{2,UL}/2)} \quad = 2 Q_{2,L}$$

D) $\omega = \omega_0$, $R_L = R_2$, ($R_s = 0$)

$2 R_n R_2 \gg \omega_0^2 M^2$ $\to 1 \gg k^2 Q_{1,UL} Q_{2,UL}/2$ $$\boxed{\eta = \frac{P_2}{P_n} \cong \frac{k^2 Q_{1,UL} Q_{2,UL}}{4} \text{ (weak coupling)}}$$

$Q_{UL}$: Q unloaded $$Q_{1,UL} = \frac{\omega L_1}{R_1}; Q_{2,UL} = \frac{\omega L_2}{R_2}$$

This shows that the output power is a function of input voltage squared $$P_2 = f(U_s^2) = I_2 \cdot I_2^* R_L; I_2 = \frac{z_M U_s}{z_1 z_2 - z_{M^2}}$$

$$P_2 = \frac{z_M z_M^* R_L}{(z_1 z_2 - z_M^2)(z_1^* z_2^* - z_M^{2*})} \cdot U_s^2$$

$$P_2 = \frac{|z_M|^2 \cdot R_L \cdot U_s^2}{z_1 z_2 z_1^* z_2^* + |z_M| + |z_M|^2 \cdot (z_1 z_2 + z_1^* z_2^*)}$$

-continued $$P_2 = \frac{|z_M|^2 \cdot R_L \cdot U_s^2}{|z_1 z_2|^2 + |z_M|^2 2\text{Re}\{z_1 z_2\} + |z_M|^4}$$

$$z_M = j\omega M$$

$$z_M^* = -j\omega M$$

$$|z_M| = \omega M = z_M z_M^*$$

$$z_M^2 = -\omega^2 M^2 = -|z_M|^2$$

$$z_M^{2*} = -\omega^2 M^2 = z_M^2 = -|z_M|^2$$

$$z_M^2 \cdot z_M^{2*} = |z_M|^4$$

$$|z_1 z_2| = |z_1| \cdot |z_2|$$

$$z_1 z_2 + z_1^* z_2^* = 2\text{Re}\{z_1 z_2\}$$

$$|z_1 \cdot z_2|^2 = |z_1|^2 \cdot |z_2|^2$$

DEFINITIONS $$z_1 = R_1' + jX_1; \; z_2 = R_2' + jX_2$$

$$|z_1 z_2|^2 = (R_1'^2 + X_1^2)(R_2'^2 + X_2^2) = R_1'^2 R_2'^2 + X_1^2 R_2'^2 + X_2^2 R_1'^2 + X_1^2 X_2^2$$

$$\text{Re}\{z_1 z_2\} = \text{Re}(R_1' + jX_1)(R_2' + jX_2) = R_1' R_2' + X_1 X_2$$

$$|z_M| = X_M$$

$$P_2 = \frac{X_M^2 R_1 \cdot U_s^2}{R_1'^2 R_2'^2 + R_1'^2 X_2^2 + R_2'^2 X_1^2 + X_1^2 X_2^2 + 2X_M^2 R_1' R_2' + 2X_M^2 X_1 X_2 + X_M^4}$$

$$P_2 = \frac{(X_M^2 R_L \cdot U_s^2)}{((R_1' R_2' + X_M^2)^2 + R_1'^2 X_2^2 + R_2'^2 X_1^2 + X_1^2 X_2^2 + 2X_M^2 X_1 X_2)}$$

Therefore, when at or near the resonance condition:

$$\omega = \omega_0 = \omega_2 = \omega_0 \rightarrow X_1 = 0, X_2 = 0$$

$$P_2 = \frac{X_M^2 R_L \cdot U_s^2}{R_1'^2 R_2'^2 + 2X_M^2 R_1' R_2' + X_M^4} = \frac{X_M^2 R_L}{(R_1' R_2' + X_M^2)^2} \cdot U_s^2$$

$$P_2 = \frac{\omega_0^2 M^2 R_L}{(R_s + R_1)^2 (R_1 + R_2)^2 + 2\omega_0^2 M^2 (R_s + R_1)(R_L + R_2) + \omega_0^4 M^4} \cdot U_s^2$$

$$\boxed{P_2 = \frac{\omega_0^2 M^2 R_L}{((R_s + R_1)(R_1 + R_2) + \omega_0^2 M^2)^2} U_s^2}$$

Showing that the power transfer is inversely proportional to several variables, including series resistances.

Mutual inductance in terms of coupling factors and inductions:

$$M = k \cdot \sqrt{L_1 L_2}$$

$$P_2 = \frac{\omega_0^2 k^2 L_1 L_2 \cdot R_L}{((R_s + R_1)(R_1 + R_2) + \omega_0^2 k^2 L_1 L_2)^2} \cdot U_s^2$$

$$= \frac{k^2 \frac{\omega_0 L_1 \omega_0 L_2}{(R_s + R_M)(R_1 + R_2)}}{\left(1 + k^2 \frac{\omega_0 L_1 \omega_0 L_2}{(R_s + R_M)(R_1 + R_2)}\right)^2} \cdot \frac{U_s^2 R_L}{(R_s + R_1)(R_L + R_2)}$$

$$\boxed{P_2 = \frac{k^2 \cdot Q_{L1} \cdot Q_{L2}}{(1 + k^2 \cdot Q_{L1} \cdot Q_{L2})^2} \cdot \frac{R_L}{(R_s + R_1)(R_L + R_2)} \cdot U_s^2}$$

The power output is proportional to the square of the input power, as described above. However, there is a maximum input power beyond which no further output power will be produced. These values are explained below. The maximum input power $P_{1,max}$ is expressed as:

$$P_{1,max} = \frac{U_s^2}{R_s + R_{in,min}} = \text{Re}\{U_s \cdot I_1^*\};$$

$R_{in,min}$: min. permissible input resistance

Efficiency relative to maximum input power:

$$\eta' = \frac{P_2}{P_{1,max}} = \frac{P_2(U_s^2)}{P_{1,max}}$$

Under resonance condition $\omega = \omega_1 = \omega_2 = \omega_0$:

$$\boxed{\eta' = \frac{\omega_0^2 M^2 R_L (R_s + R_{in,min})}{[(R_s + R_1)(R_1 + R_2) + \omega_0^2 M^2]^2}}$$

Equation for input power ($P_1$) under the resonance condition is therefore:

$$P_1 = \frac{P_2}{\eta} = \frac{\omega_0^2 M^2 R_L [(R_s + R_1)(R_1 + R_2) + \omega_0^2 M^2](R_L + R_2)}{[(R_s + R_2)(R_L + R_2) + \omega_0^0 M^2]^2 \cdot \omega_0^2 M^2 R_L} \cdot U_s^2$$

$$\boxed{P_1 = \frac{R_L + R_2}{(R_s + R_1)(R_L + R_2) + \omega_0^2 M^2} \cdot U_s^2}$$

For $(R_s + R_M)(R_L + R_2) \gg \omega_0^2 M^2$:

$$P_1 \cong \frac{U_s^2}{(R_s + R_1)}$$

The current ratio between input and induced currents can be expressed as $$\frac{I_2}{I_1} = \frac{z_M \cdot U_s \cdot (z_1 z_2 - z_n^2)}{(z_1 z_2 - z_M^2) z_2 U_s} = \frac{z_M}{z_2} = \frac{j\omega M}{R_L + R_2 + j\left(\omega L_2 - \frac{1}{\omega C_2}\right)}$$

-continued $$\text{at } \omega = \omega_0 = \frac{1}{\sqrt{L_2 C_2}}$$

$$\boxed{\frac{I_2}{I_1} = \frac{j\omega M}{R_1 + R_2}}$$

$$\text{avg.}\left\{\frac{I_2}{I_1}\right\} = \frac{\pi}{2}$$

Weak coupling: $R_1 + R_2 > |j\omega M|$
$\rightarrow I_2 < I_1$
Strong coupling: $R_1 + R_2 < |j\omega M|$
$\rightarrow I_2 > I_1$
Input current $I_1$: (under resonance condition)

$$I_1 = \frac{P_1}{U_S} = \frac{(R_1 + R_2) \cdot U_s}{(R_S + R_1)(R_L + R_2) + \omega_0^2 M^2}$$

$$\boxed{I_1 = \frac{(R_L + R_2)}{(R_s + R_1)(R_L + R_2) + \omega_0^2 M^2} \cdot U_s}$$

Output current $I_2$: (under resonance condition)

$$\boxed{I_2 = \frac{j\omega M}{(R_s + R_1)(R_L + R_2) + \omega_0^2 M^2} \cdot U_s}$$

Maximizing transfer efficiency and output power ($P_2$) can be calculated according to the transfer efficiency equation:

$$\eta = \frac{P_2}{P_1} = \frac{\omega^2 M^2 R_L}{(R_s + R_n)\left[(R_L + R_2)^2 + \left(\omega L_2 - \frac{1}{\omega C_2} + X_L\right)^2\right] + \omega^2 M^2 (R_L + R_2)}$$

After reviewing this equation, an embodiment forms circuits that are based on observations about the nature of how to maximize efficiency in such a system.
Conclusion 1)
$\eta(L_2, C_2, X_L)$ reaches maximum for $$\omega L_2 - \frac{1}{\omega C_2} + X_L = 0$$

That is, efficiency for any L, C, X at the receiver is maximum when that equation is met.
Transfer efficiency wide resonance condition:

$$\eta = \frac{P_2}{P_1}\bigg|_{\omega=\omega_0} = \frac{\omega_0^2 M^2}{[(R_s + R_n)(R_L + R_2) + \omega_0^2 M^2]} \cdot \frac{R_1}{(R_L + R_2)}$$

Conclusion 2)
To maximise $\eta$ $R_S$ should be $R_S \ll R_1$
That is, for maximum efficiency, the source resistance $R_S$ needs to be much lower than the series resistance, e.g., 1/50, or 1/100$^{th}$ or less
Transfer efficiency under resonance and weak coupling condition:

$$(R_s + R_n)(R_L + R_2) \gg \omega_0^2 M^2$$

$$\eta \cong \frac{\omega_0^2 M^2 \cdot \underline{R_L}}{(R_s + R_n)(\underline{R_L} + R_2)^2}$$

Maximising $\eta(R_L)$:

$$\frac{d\eta}{dR_L} = \frac{\omega_0^2 M^2}{R_s + R_1} \cdot \frac{(R_L + R_2) - 2R_L}{(R_L + R_2)^3} = 0 \rightarrow R_L = R_2$$

Conclusion 3)
$\eta$ reaches maximum for $R_L = R_2$ under weak coupling condition.
That is, when there is weak coupling, efficiency is maximum when the resistance of the load matches the series resistance of the receiver.
Transfer efficiency under resonance condition.
Optimizing $R_L$ to achieve max. $\eta$ $$\frac{d\eta}{dR_L} = 0;$$

$$\frac{d}{dR_L} \cdot \underbrace{\frac{\omega_0^2 M^2 R_L}{(R_s + R_1)(R_L + R_2)^2 + \omega_0^2 M^2 (R_L + R_2)}}_{R_1} \frac{u}{v}$$

$$\frac{u \cdot v' - v \cdot u'}{v^2} = 0$$

$$u \cdot v' - v \cdot u' = 0$$

$$u = \omega_0^2 M^2 \cdot R_L;$$

$$u' = \omega_0^2 M^2$$

$$v = R_1'(R_L + R_2)^2 + \omega_0^2 M^2 (R_1 + R_2)$$

$$v' = 2R_1'(R_L + R_2) + \omega_0^2 M^2$$

$$u \cdot v' - v \cdot u' = \omega_0^2 M^2 R_L(2R_1'(R_L + R_2) + \omega_0^2 M^2) -$$
$$(R_1'(R_1 + R_2)^2 + \omega_0^2 M^2 (R_L + R_2))\omega_0^2 M^2 = 0$$
$$= 2R_1' R_L(R_L + R_2) + \omega_0^2 M^2 R_L - R_1'(R_L + R_2)^2 -$$
$$\omega_0^2 M^2 (R_L + R_2) = 0$$
$$= 2R_1' R_L^2 + 2R_1' R_2 R_L + \omega_0^2 M^2 R_L - R_1' R_L^2 - 2R_1' R_2 R_L - R_1' R_2^2 -$$
$$\omega_0^2 M^2 R_L - \omega_0^2 M^2 R_2 = 0$$
$$= (1R_1' - R_1')R_L^2 - R_1' R_2^2 - \omega_0^2 M^2 R_2 = 0$$

$$R_L^2 = \frac{R_1' R_2^2 + \omega_0^2 M^2 R_2}{R_1'}$$

$$R_L = \pm \sqrt{\frac{(R_s + R_1)R_2^2 + \omega_0^2 M^2 R_2}{(R_s + R_1)}} = \pm R_2 \cdot \sqrt{\frac{(R_s + R_1) + \omega_0^2 M^2 / R_2}{(R_s + R_1)}}$$

$$\boxed{R_{L,opt} = R_2 \sqrt{1 + \frac{\omega_0^2 M^2}{(R_s + R_1)R_2}}}$$

Weak coupling condition $\omega_0^2 M^2 \ll (R_s + R_1)R_2$ $$R_{L,opt} \cong R_2$$

Conclusion 4)

There exists an optimum $R_L > R_2$ maximising $\eta$

Output power $P_2$:

$$P_2 = \frac{X_M^2 R_1 U_s^w}{(R_1' R_2' + X_M^2)^2 + R_1'^2 \underline{X_2^2} + R_2'^2 \underline{X_1^2} + \underline{X_1^2 X_2^2} + 2 X_M^2 \underline{X_2 X_2}}$$

Conclusion 5)

Output power $P_2(X_1, X_2)$ reaches maximum for $$X_1 = \omega L_1 - \frac{1}{\omega C_1} + X_s = 0$$

$$X_2 = \omega L_2 - \frac{1}{\omega C_2} + X_L = 0$$

that is, when there is a resonance condition at both the primary and the secondary.

Output power $P_2$ wide resonance condition:

$$P_2 = \frac{\omega_0^2 M^2 \cdot R_L}{\left[(\underline{P_s} + R_1)(R_1 + R_2) + \omega_0^2 M^2\right]^2} \cdot U_s^2$$

Conclusion 6)

To maximize $P_2$, $R_S$ should be $R_S \ll R_1$

Output power $P_2$ for the wide resonance and weak coupling condition:

$$(R_s + R_1)(R_L + R_2) \gg \omega_0^2 M^2$$

$$P_2 \cong \frac{\omega_0^2 M^2 R_L}{(R_s + R_1)^2 (R_L + R_2)^1} \cdot U_s^2$$

Conclusion 7)

$P_2(R_L)$ reaches maximum for $R_L = R_2$ (see conclusion 3)

For each of the above, the $\gg$ or $\ll$ can represent much greater, much less, e.g., 20× or 1/20 or less, or 50× or 1/50$^{th}$ or less or 100× or 1/100$^{th}$ or less.

The value $R_L$ can also be optimized to maximize $P_2$:

$$\frac{dP_2}{dR_L} = 0$$

$$\frac{u \cdot v' - v \cdot u'}{v^2} = 0$$

$$u = \omega_0^2 M^2 R_L;$$

$$u' = \omega_0^2 M^2$$

$$v = [(R_1')(R_L + R_2) + \omega_0^2 M^2]^2$$

$$v' = 2 \cdot [R_1'(R_L + R_2) + \omega_0^2 M^2] \cdot R_1'$$

$$\omega_0^2 M^2 \cdot R_L \cdot 2[R_1'(R_1 + R_2) + \omega_0^2 M^2] R_1 -$$

$$[R_1'(R_L + R_2) + \omega_0^2 M^2]^2 \cdot \omega_0^2 M^2 = 0$$

$$2 R_L (R_1'^2 R_L + R_1'^2 R_2) + 1 R_L \omega_0^2 M^2 \cdot R_1' - [R_1' R_L + R_1' R_2 + \omega_0^2 M^2]^2 = 0$$

$$2 R_1'^2 R_L^2 + 2 R_1'^2 R_2 R_L + 2 \omega_0^2 M^2 R_1' R_L - R_1'^2 R_L^2 - R_1'^2 R_2^2 -$$

$$\omega_0^2 M^4 - 2 R_1'^2 R_2 R_L - 2 R_1' \omega_0^2 M^2 R_L - 2 R_1' R_2 \omega_0^2 M^2 =$$

$$0 = (2 R_1'^2 - R_1'^2) R_L^2 - R_1'^2 R_2^2 - 2 R_1' R_2 \omega_0^2 M^2 - \omega_0^2 M^4 =$$

$$0 = R_1'^2 \cdot R_L^2 - (R_1' R_2 + \omega_0^2 M^2)^2 = 0$$

$$R_L^2 = \frac{(R_1' R_2 + \omega_0^2 M^2)^2}{R_1'^2}$$

$$R_{L,opt} = \frac{R_1' R_2 + \omega_0^2 M^2}{R_1'} = R_2 \left(1 + \frac{\omega_0^2 M^2}{(R_s + R_1) R_2}\right)$$

$$\boxed{R_{L,opt} = R_2 \cdot \left(1 + \frac{\omega_0^2 M^2}{(R_s + R_1) R_2}\right) \quad \text{Weak coupling} \\ R_{L,opt} \stackrel{\cong}{>} R_2}$$

Conclusion 8)

There exists an optimum $R_L > R_2$ maximizing $P_2$. This $R_{1opt}$ differs from the $R_{1,opt}$ maximizing $\eta$.

One embodiment operates by optimizing one or more of these values, to foam an optimum value.

Figure 3:
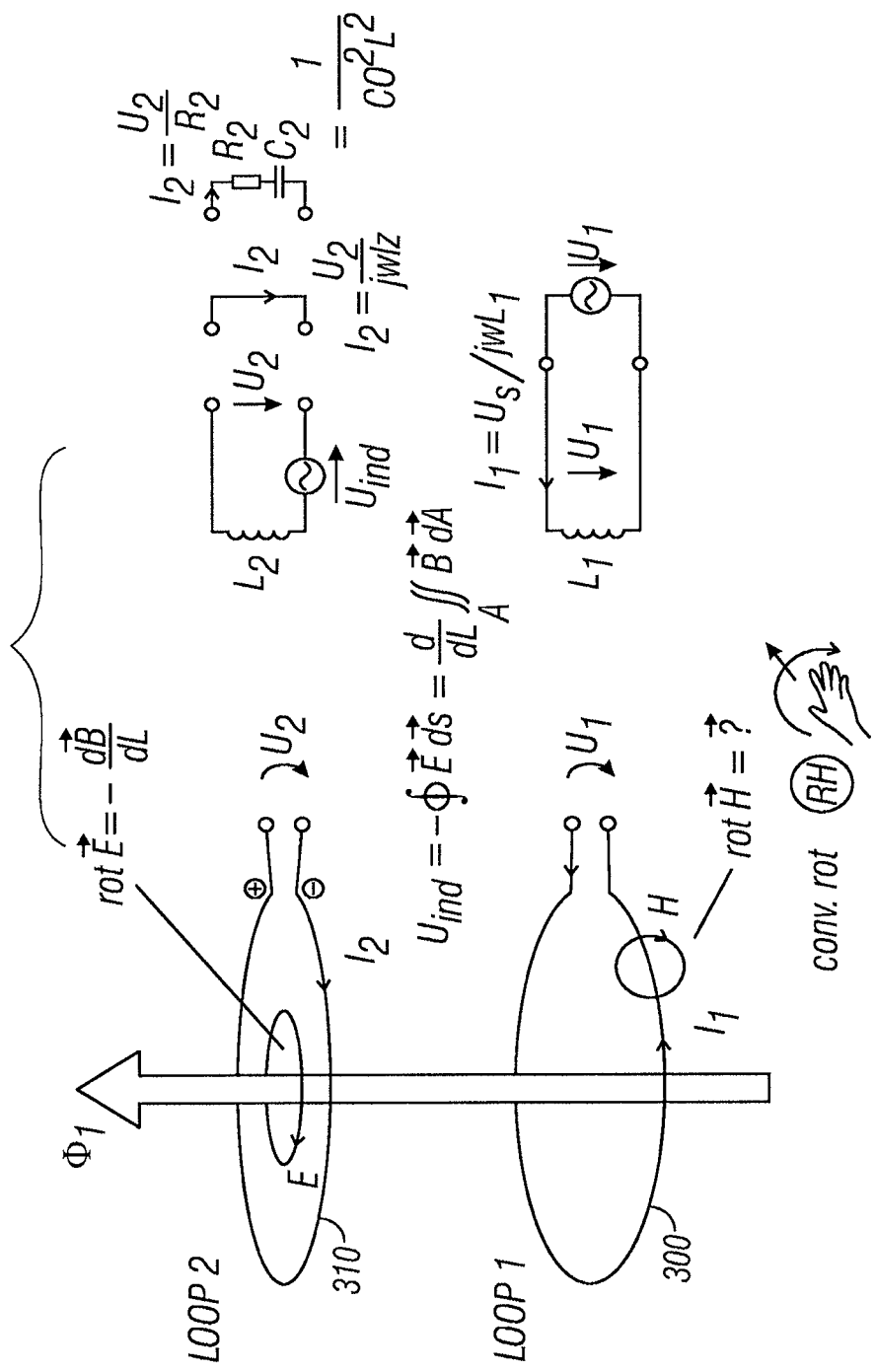
FIG. 3 shows a diagram of inductive coupling.
Figure 4:
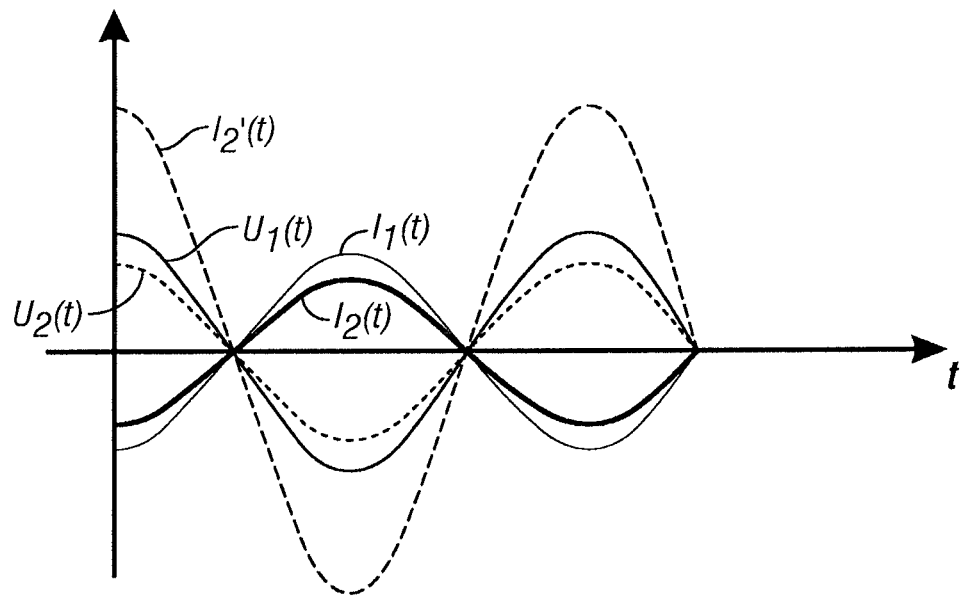
FIG. 4 shows a plot of the inductive coupling.

Inductive coupling is shown with reference to FIGS. 3, 4

Figure 5:
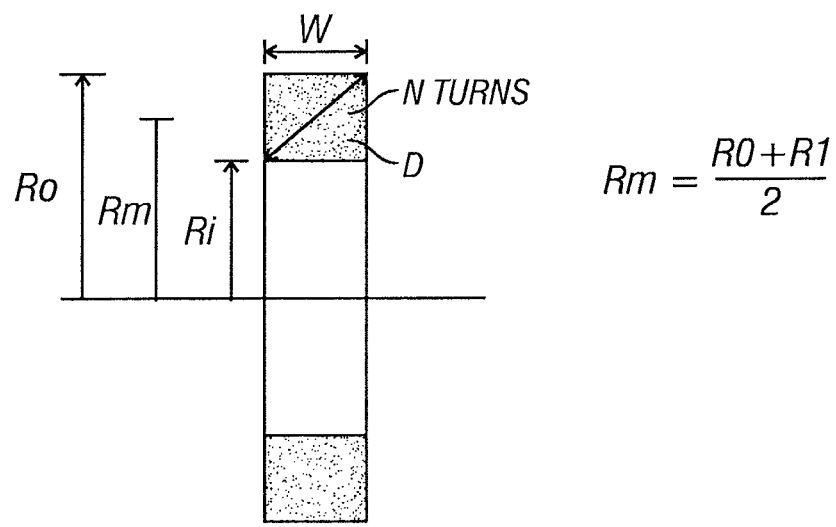
FIG. 5 shows geometry of an inductive coil.

FIG. 5 illustrates the Inductance of a multi-turn circular loop coil $$R_m = \frac{R_0 + R_1}{2}$$

| Wheeler formula (empirical) | [Wheeler, H. A., "Simple inductance |
| --- | --- |
| $L = \dfrac{0.8 R_m^2 \cdot N^2}{6 R_m + 9w + 10((R_o - R_1)}$ | formulas for radio coils". Proc. IRE |
|  | Vol 16, pp. 1328-1400, Oct. 1928.] |
| Note: this $i$ accurate if all three terms in denominator are about equal. | $[L] \mu H$ |
|  | $[R_m, R_i, R_0, \omega] = \text{inch}$ |
| Conversion to $H$, $m$ units: | $1 \, m = \dfrac{\dfrac{\wp}{1000}}{-154} \cdot \text{inch}$ |
| $L = \dfrac{0.8 \cdot R_m^2 \cdot \wp^2 \cdot N^1 \cdot 10^{-6}}{6 R_m \cdot \wp + 9 \cdot w \cdot \wp + 10(R_0 - R_1) \wp}$ | $1 \, H = 10^6 \, \mu H$ |
| $L = \dfrac{0.8 \cdot R_m^2 \cdot \wp^2 \cdot N^2 \cdot 10^{-6}}{6 R_m + 9w + 10(R_0 - R_1)}$ | $[L] = H$ |
|  | $[R_m R_0 R_1 \omega] = m$ |

In standard form:

$$L = \frac{\mu_0 \cdot A_m \cdot N^2}{K_c};$$

$$A_m = \pi \cdot R_m^2$$

$$\mu_0 = 4\pi \cdot 10^{-7}$$

$$L = \frac{0.8 \cdot \wp \cdot 10^{-6} \cdot \overline{\pi R_m^2} \cdot N^2 \cdot \overline{4\pi \cdot 10^{-7}}}{\pi \cdot 4\pi \cdot 10^{-7}(6R_m + 9w + 10(R_0 - R_1))}$$

$$L = \frac{\mu_0 A_m \cdot N^2 \cdot 0.8 \wp 10^{-6} \cdot 10}{4\pi^2 \cdot 10^{-7}(6R_m + 9w + 10(R_0 - R_1))} \frac{1}{K_c} \quad R_m = \sqrt{\frac{A_m}{\pi}}$$

$$K_c = \frac{\pi^2 \cdot 25.4 \left(6\sqrt{\frac{A_m}{\pi}} + 9w + 10(R_0 - R_1)\right)}{2 \cdot 1000}$$

$$K_c \cong \frac{1}{8} \cdot \left(6\sqrt{\frac{A_m}{\pi}} + 9w + 10(R_0 - R_1)\right)$$

$$L = \frac{\mu_0 A_m N^2}{K_c};$$

$$A_m = \left(\frac{(R_0 + R_1)}{2}\right)^2 \cdot \pi$$

$$[L] = H$$

The inductance of a single-turn circular loop is given as:

$$K_c = \frac{R_m \cdot \pi}{\wp \left[\frac{8R_m}{6} - 2\right]}$$

$$L = \frac{\mu_0 A_m}{K_c};$$

$$A_m = R_m^2 \cdot \pi$$

$$[L] = H$$

where:

$R_m$: mean radius in m b: wire radius in m,

For a Numerical example:

$R_1$=0.13 m $R_0$=0.14 m $\omega$=0.01 m

N=36

→L=0.746 mH

The measured inductance $L_{meas}$=0.85 mH

The model fraction of Wheeler formula for inductors of similar geometry, e.g, with similar radius and width ratios is:

$$K_c = \frac{1}{8}\left(5\sqrt{\frac{A_m}{\pi}} + 9w + 10(R_0 - R_1)\right)$$

$$D = \sqrt{W^2 + (R_0 - R_1)^2}$$

-continued $$R_m = \frac{R_0 + R_1}{2}$$

Using a known formula from Goddam, V. R., which is valid for w>($R_0$–$R_1$)

$$L = 0.03193 \cdot R_m \cdot N^2 \left[2.303\left(1 + \frac{w^2}{32R_m^2} + \frac{D^2}{96R_m^2}\right)\log\left(\frac{8R_m}{D}\right) - \wp + \frac{w_{1/2}^2}{16R_m^2}\right]$$

1w H,m units:

$$L = \mu_0 R_m \cdot N^2 \left[\left(1 + \frac{w^2}{32R_m^2} + \frac{D^2}{96R_m^2}\right)\ln\left(\frac{8R_m}{D}\right) - \wp + \frac{w^2 y_2}{16R_m^2}\right]$$

Example 1

$R_1$ = 0.13 m $R_0$ = 0.14 m

W = 0.01 m

N = 36

L = 757 $\mu$H

Ratio: $\frac{W}{R_0 - R_1} = 1$

→ $y_1$ = 0.8483

$y_2$ = 0.816

From [Terman, F.]

Example 2

Given in [Goddam, V. R.]

$R_0$ = 8.175 inches $R_1$ = 7.875 inches

W = 2 inches

N = 57

$y_1$ = 0.6310

$y_2$ = 0.142

→ L = 2.5 mH (2.36 mH)

Ratio: $\frac{2}{R_0 - R_1} = \frac{2}{0.3} = 6.667$ or $\frac{R_0 - R_1}{W} = \frac{0.3}{2} = 0.15$ where Goddam, V. R. is the Thesis Masters Louisiana State University, 2005, and Terman, F. is the Radio Engineers Handbook, McGraw Hill, 1943.

Any of these values can be used to optimize wireless power transfer between a source and receiver.

From the above, it can be seen that there are really two different features to consider and optimize in wireless transfer circuits. A first feature relates to the way in which efficiency of power transfer is optimized. A second feature relates to maximizing the received amount of power—independent of the efficiency.

One embodiment, determines both maximum efficiency, and maximum received power, and determines which one to use, and/or how to balance between the two.

In one embodiment, rules are set. For example, the rules may specify:

Rule 1—Maximize efficiency, unless power transfer will be less than 1 watt. If so, increase power transfer at cost of less efficiency.

Rule 2—Maximize power transfer, unless efficiency becomes less than 30%.

Any of these rules may be used as design rules, or as rules to vary parameters of the circuit during its operation. In one embodiment, the circuit values are adaptively changes based on operational parameters. This may use variable components, such as variable resistors, capacitors, inductors, and/or FPGAs for variation in circuit values.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An apparatus configured to receive wireless power from a transmitter, the apparatus comprising:
    an inductor having an inductance value;
    a capacitor electrically connected to the inductor and having a capacitance value; and
    an optimizing circuit configured to:
        optimize transfer efficiency of power received wirelessly from the transmitter, provided that an amount of the power received wirelessly and provided to a load is greater than or equal to a received power threshold, or
        optimize the amount of the power received wirelessly from the transmitter, provided that the power transfer efficiency is greater than or equal to an efficiency threshold.

2. The apparatus of claim 1, wherein the optimizing circuit is configured to optimize power transfer efficiency or optimize the amount of power received based at least in part on maintaining a first resonant frequency of the transmitter substantially equal to a second resonant frequency of a receive circuit comprising the inductor and capacitor.

3. The apparatus of claim 1, wherein the optimizing circuit is configured to optimize power transfer efficiency or optimize the amount of power received based at least in part on whether the transmitter is weakly coupled to the receive circuit as compared to when the transmitter is strongly coupled to the receive circuit.

4. The apparatus of claim 1, wherein the optimizing circuit is configured to maintain a resistance of the inductor substantially equal to a series resistance.

5. The apparatus of claim 1, wherein the optimizing circuit comprises at least one of a first component configured to vary the inductance value of the inductor, a second component configured to vary the capacitance value of the capacitor, a variable resistor, or an FPGA.

6. A method for wirelessly receiving power from a transmitter, the, the method comprising:
    optimizing transfer efficiency of power received wirelessly from the transmitter, provided that an amount of the power received wirelessly and provided to a load is greater than or equal to a received power threshold; or
    optimizing the amount of the power received wirelessly from the transmitter, provided that the power transfer efficiency is greater or equal to an efficiency threshold.

7. The method of claim 6, wherein optimizing power transfer efficiency and optimizing the amount of the received power comprises optimizing based on at least one of maintaining a first resonant frequency of the transmitter substantially equal to a second resonant frequency of a receive circuit comprising an inductor and capacitor or based on whether the transmitter is weakly coupled to the receive circuit as compared to when the transmitter is strongly coupled to the receive circuit.

8. An apparatus configured to receive wireless power from a transmitter, the apparatus comprising:
    means for optimizing transfer efficiency of power received wirelessly from a transmitter, provided that an amount of the power received wirelessly and provided to a load is greater than or equal to a received power threshold; or
    means for optimizing the amount of the power received wirelessly, provided that the power transfer efficiency is greater or equal to an efficiency threshold.

9. The apparatus of claim 8, wherein the means for optimizing power transfer efficiency and optimizing the amount of the received power comprises means for optimizing based on at least one of maintaining a first resonant frequency of the transmitter substantially equal to a second resonant frequency of a receive circuit comprising an inductor and capacitor or based on whether the transmitter is weakly coupled to the receive circuit as compared to when the transmitter is strongly coupled to the receive circuit.

10. An apparatus configured to transmit wireless power to a receiver, the apparatus comprising:
    an inductor having an inductance value;
    a capacitor electrically connected to the inductor and having a capacitance value; and
    an optimizing circuit configured to:
        optimize transfer efficiency of power transmitted wirelessly to the receiver, provided that an amount of power received wirelessly and provided to a load of the receiver is greater than or equal to a received power threshold; or
        optimize the amount of the power received wirelessly, provided that the power transfer efficiency is greater than or equal to an efficiency threshold.

11. The apparatus of claim 10, wherein the optimizing circuit comprises at least one of a first component configured to vary the inductance value of the inductor, a second component configured to vary the capacitance value of the capacitor, a variable resistor, or an FPGA.

12. An apparatus for receiving power via a wireless field and for delivering power to a load, the apparatus comprising:
a first antenna circuit coupled to the load and comprising an antenna, the first antenna circuit being configured to receive power via the wireless field for powering the load, the received power corresponding to a time-varying voltage signal from a second antenna circuit, the load being characterized by a reactance X and the first antenna circuit being characterized by an inductance L and a capacitance C, at least one of the inductance L and capacitance C configured to maintain the reactance X to be substantially equal to a first value that is inversely proportional to the capacitance C minus a second value that is directly proportional to the inductance L; and
a controller coupled to the first antenna circuit and configured to adjust at least one parameter of the first antenna circuit.

13. The apparatus of claim 12, wherein the first antenna circuit comprises a variable inductor and a variable capacitor, wherein the controller is configured to adjust the inductance L by adjusting the variable inductor, and wherein the controller is configured to adjust the capacitance C by adjusting the variable capacitor.

14. The apparatus of claim 12, wherein the controller comprises an FPGA.

15. The apparatus of claim 12, wherein the first antenna circuit comprises a first inductive coil.

16. The apparatus of claim 12, wherein the received power is coupled from a near-field of the second antenna circuit.

17. The apparatus of claim 12, wherein the first antenna circuit is configured to oscillate at a frequency substantially equal to a resonant frequency of the first antenna circuit in response to the wireless field produced by the second antenna circuit.

18. A method of receiving power via a wireless field and for delivering power to a load, the apparatus comprising:
wirelessly receiving power at a first antenna circuit for powering the load, the received power corresponding to a time-varying voltage signal from a second antenna circuit, the load being characterized by a reactance X and the first antenna circuit being characterized by an inductance L and a capacitance C, at least one of the inductance L and capacitance C configured to maintain the reactance X to be substantially equal to a first value that is inversely proportional to the capacitance C minus a second value that is directly proportional to the inductance L; and
adjusting at least one parameter of the first antenna circuit.

19. The method of claim 18, wherein the first antenna circuit comprises a variable inductor and a variable capacitor, wherein adjusting the at least one parameter comprises adjusting the variable inductor, and wherein adjusting the at least one parameter comprises adjusting the variable capacitor.

20. The method of claim 18, wherein wirelessly receiving power comprising coupling power from a near-field of the second antenna circuit.

21. The method of claim 18, wherein the first antenna circuit is configured to oscillate at a frequency sustainably equal to a resonant frequency of the first antenna circuit in response to the wireless field produced by the second antenna circuit.

22. An apparatus for receiving power via a wireless field and for delivering power to a load, the apparatus comprising:
means for wirelessly receiving power for powering the load, the received power corresponding to a time-varying voltage signal from a second antenna circuit, the load being characterized by a reactance X and the means for wirelessly receiving power being characterized by an inductance L and a capacitance C, at least one of the inductance L and capacitance C configured to maintain the reactance X to be substantially equal to a first value that is inversely proportional to the capacitance C minus a second value that is directly proportional to the inductance L; and
means for adjusting at least one parameter of the means for wirelessly receiving power.

23. The apparatus of claim 22, wherein the means for wirelessly receiving power comprises a first antenna circuit comprising a variable inductor and a variable capacitor, wherein the means for adjusting comprises means for adjusting the variable inductor, and wherein the means for adjusting comprises means for adjusting the variable capacitor.

24. The apparatus of claim 22, wherein the means for adjusting comprises a controller.

25. The apparatus of claim 22, wherein the received power is coupled from a near-field of the second antenna circuit.

26. The apparatus of claim 22, wherein the means for wirelessly receiving power is configured to oscillate at a frequency substantially equal to a resonant frequency of the means for wirelessly receiving power in response to the wireless field produced by the second antenna circuit.

27. An apparatus for delivering power to a load via a wireless field, the apparatus comprising:
a power source configured to output a time-varying voltage signal at a voltage level and characterized by a reactance X; and
a first antenna circuit configured to receive the voltage signal from the power source and to output power to a second antenna circuit to power the load via the wireless field, the first antenna circuit characterized by an inductance L and a capacitance C, at least one of the inductance L and capacitance C configured to maintain the reactance X to be substantially equal to a first value that is inversely proportional to the capacitance C minus a second value that is directly proportional to the inductance L.

* * * * *